United States Patent
Pinappu et al.

(10) Patent No.: US 11,331,649 B2
(45) Date of Patent: May 17, 2022

(54) REGENERATED ADSORBENT BEDS FOR SULFUR COMPOUND REMOVAL

(71) Applicant: Baker Hughes Oilfield Operations LLC, Houston, TX (US)

(72) Inventors: Sai Reddy Pinappu, Houston, TX (US); Jerry J. Weers, Richmond, TX (US); Timothy J. O'Brien, Sugar Land, TX (US); Waynn C. Morgan, Alvin, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 119 days.

(21) Appl. No.: 16/937,926

(22) Filed: Jul. 24, 2020

(65) Prior Publication Data
US 2022/0023834 A1    Jan. 27, 2022

(51) Int. Cl.
*B01J 20/20* (2006.01)
*C10G 25/12* (2006.01)
*B01J 20/34* (2006.01)
*B01J 20/12* (2006.01)
*C10G 25/00* (2006.01)

(52) U.S. Cl.
CPC .......... *B01J 20/3475* (2013.01); *B01J 20/12* (2013.01); *B01J 20/20* (2013.01); *B01J 20/3416* (2013.01); *B01J 20/3433* (2013.01); *C10G 25/003* (2013.01); *C10G 25/12* (2013.01); *C10G 2300/104* (2013.01); *C10G 2300/1051* (2013.01); *C10G 2300/202* (2013.01); *C10G 2400/02* (2013.01); *C10G 2400/08* (2013.01)

(58) Field of Classification Search
None
See application file for complete search history.

(56) References Cited

U.S. PATENT DOCUMENTS

| | | | |
|---|---|---|---|
| 4,094,650 A * | 6/1978 | Koh | C07C 1/00 252/373 |
| 4,122,149 A | 10/1978 | Dunnery et al. | |
| 4,449,994 A * | 5/1984 | Hegarty | F25J 3/04527 62/622 |
| 5,935,422 A | 8/1999 | Zinnen | |
| 6,406,616 B1 | 6/2002 | Rappas et al. | |
| 6,488,840 B1 | 12/2002 | Greaney et al. | |
| 6,558,533 B2 | 5/2003 | Schmidt et al. | |
| 7,128,829 B1 | 10/2006 | Kulprathipanja et al. | |
| 7,144,499 B2 | 12/2006 | Han et al. | |
| 7,186,328 B1 | 3/2007 | Schultz et al. | |
| 7,244,352 B2 | 7/2007 | Halbert et al. | |
| 7,344,686 B2 | 3/2008 | Poshusta et al. | |
| 8,142,646 B2 | 3/2012 | Choi et al. | |
| 8,562,821 B2 | 10/2013 | Nanoti et al. | |
| 9,340,808 B2 | 5/2016 | Harata et al. | |
| 2005/0173297 A1 | 8/2005 | Toida | |
| 2015/0038759 A1* | 2/2015 | Doong | C10L 3/103 585/802 |
| 2018/0169561 A1* | 6/2018 | Jonnavittula | B01J 20/226 |

FOREIGN PATENT DOCUMENTS

| | | |
|---|---|---|
| CN | 102852068 A | 1/2013 |
| CN | 102852069 A | 1/2013 |
| WO | 2008039205 A1 | 4/2008 |
| WO | 2017184591 A1 | 10/2017 |
| WO | 2018009497 A1 | 1/2018 |

OTHER PUBLICATIONS

Wang, Yuhe, et al., "Desulfurization of Liquid Fuels by Adsorption on Carbon-Based Sorbents and Ultrasound-Assisted Sorbent Regeneration", American Chemical Society, Feb. 2007, 3825-3831.

* cited by examiner

*Primary Examiner* — Tam M Nguyen
(74) *Attorney, Agent, or Firm* — Mossman, Kumar & Tyler, P.C.

(57) ABSTRACT

A solvent comprised of (1) a caustic and an alcohol, (2) a caustic and a quaternary ammonium hydroxide, or (3) a caustic, an alcohol, and a quaternary ammonium hydroxide may contact an adsorbent bed that has been used to remove sulfur compounds from a hydrocarbon stream to extract adsorbed sulfur compounds from the adsorbent material in the bed to regenerate it. The regenerated adsorbent bed may be reused, either alone or in combination with a liquid-liquid extraction column, to remove sulfur compounds from a hydrocarbon stream.

20 Claims, No Drawings

REGENERATED ADSORBENT BEDS FOR SULFUR COMPOUND REMOVAL

TECHNICAL FIELD

The present invention relates to methods and compounds for regenerating adsorbent beds used in removal of sulfur compounds from a hydrocarbon stream, and more particularly relates, in one non-limiting embodiment, to contacting an adsorbent bed with a regeneration solvent comprising a caustic and an alcohol and/or a quaternary ammonium hydroxide to extract adsorbed sulfur compounds from the adsorbent for reuse of the bed in further hydrocarbon stream treatment.

BACKGROUND

New U.S. regulations and international standards aimed at reducing emissions from the burning of fuels for energy are putting ever-increasing restrictions on the allowable sulfur content of finished hydrocarbon streams across the global oil and gas industry.

As part of the ongoing initiative to improve ambient air quality, the U.S. Environmental Protection Agency (EPA) in 2017 revised their gasoline standards around sulfur content from the previous Tier 2 specifications to the new Tier 3 specifications. Consequently, refineries are being forced to reduce the total sulfur content in light hydrocarbons that may be used as blend components in their finished gasoline or diesel pools.

In some cases, sulfur adsorbent beds or columns have been used to remove certain sulfur compounds, such as thiophenes, which are relatively inert and more difficult to remove, from hydrocarbon streams. However, there are feasibility issues associated with the use of adsorbent beds/columns to remove sulfur compounds from hydrocarbon streams that partly result from the limited sulfur loading capacity of these columns. Once the adsorbent column has reached maximum sulfur loading, the column either needs to be replenished with fresh adsorbent material or these columns need to be regenerated. Often the columns have to be replenished or regenerated off-site, leading to increased processing costs for refineries.

Therefore, a need exists for a developing a more cost-effective way to regenerate adsorbent beds/columns that are used for the removal of non-acidic compounds (e.g. sulfur compounds) from hydrocarbon streams.

SUMMARY

There is provided, in one form, a process for regenerating an adsorbent bed that has been used to remove sulfur compounds from hydrocarbon streams in which an effective amount of regeneration solvent comprising a combination of compounds that is (1) a caustic and an alcohol, (2) a caustic and a quaternary ammonium hydroxide, or (3) a caustic, an alcohol, and a quaternary ammonium hydroxide is contacted with adsorbent material in the adsorbent bed to extract adsorbed sulfur compounds from the adsorbent bed.

There is further provided, in another form, a process of removing sulfur compounds from a hydrocarbon stream using a regenerated adsorbent bed, the process comprising contacting a hydrocarbon stream containing sulfur compounds with a regenerated adsorbent bed, wherein the regenerated adsorbent bed contains at least 5 grams of regenerated adsorbent material, and wherein, prior to contacting with the hydrocarbon stream, the adsorbent bed is contacted with at least 10 milliliters per 5 grams of adsorbent material of a regeneration solvent comprising (1) a caustic and an alcohol, (2) a caustic and a quaternary ammonium hydroxide, or (3) a caustic, an alcohol, and a quaternary ammonium hydroxide. In yet another form, the regenerated adsorbent bed may be used in combination with a liquid-liquid extraction column to remove sulfur compounds from a hydrocarbon stream.

DETAILED DESCRIPTION

It has been discovered that a regeneration solvent composed of one of the following combination of compounds: (1) a caustic and an alcohol, (2) a caustic and a quaternary ammonium hydroxide, or (3) a caustic, an alcohol, and a quaternary ammonium hydroxide is useful and effective in extracting adsorbed sulfur species, such as thiophenes, from adsorbent materials in adsorbent beds that are employed to remove sulfur compounds from hydrocarbon streams. It has also been discovered that an adsorbent bed, which has been regenerated using such a solvent, used alone or in combination with a liquid-liquid extraction column, is effective for removing sulfur compounds from hydrocarbon streams.

In one embodiment, the regeneration solvent useful for adsorbed sulfur compound extraction from adsorbent material in an adsorbent bed comprises a caustic and an alcohol. In another non-limiting embodiment, the regeneration solvent is comprised of a caustic and a quaternary ammonium hydroxide.

In another non-restrictive version, the regeneration solvent may comprise all three of these components.

The caustics that may be suitable to use in the regeneration solvent of this disclosure include, but are not limited to, potassium hydroxide, sodium hydroxide, lithium hydroxide, calcium hydroxide, magnesium hydroxide, sodium carbonate, sodium bicarbonate, potassium carbonate, potassium bicarbonate, calcium carbonate, calcium bicarbonate, magnesium carbonate, magnesium bicarbonate, lithium carbonate, lithium bicarbonate, and combinations thereof. In addition, the caustic used in the regeneration solvent may be a solution of from about 5 wt % caustic in water to a saturated aqueous caustic solution at the temperature of the process. In one non-limiting embodiment, the caustic solution ranges from about 5 wt % to about 50 wt % caustic; alternatively from about 5 wt % to about 40 wt % caustic.

Non-limiting examples of alcohols that may be used in the regeneration solvent include methanol, ethanol, propanol, glycol, polyglycols and combinations thereof. Suitable polyglycols include, but are not necessarily limited to, glycerin and glycol ethers (in non-limiting examples, ethylene glycol and diethyleneglycol mono and dialkyl ethers of glycols where the alkyl group is C1 (methyl) to C4 (butyl)). These would include solvents like methoxyethanol and butoxyethanol.

The quaternary ammonium hydroxide component may be, but is not limited to, tetraethylammonium hydroxide, tetramethylammonium hydroxide, tetrabutylammonium hydroxide, ethyltrimethylammonium hydroxide, benzyltrimethylammonium hydroxide and the carbonates and bicarbonates of each quat above, i.e. tetraethylammonium carbonate or tetraethylammonium bicarbonate, and combinations thereof.

In one non-limiting embodiment, the regeneration solvent is one-half a solution of about 40 wt % caustic in water and one-half a mixture of 12 wt % sodium borohydride and alcohol. In an alternative non-restrictive embodiment, the regeneration solvent comprises about 50 wt % of a solution of 40 wt % caustic in water and about 50 wt % of a mixture of 12 wt % sodium borohydride and quaternary ammonium hydroxide. In yet another non-limiting embodiment, the regeneration solvent is made up of about 25 wt % of a solution of 40 wt % caustic in water, about 50 wt % of a mixture of 12 wt % sodium borohydride and an alcohol, and about 25 wt % quaternary ammonium hydroxide. In another non-limiting embodiment the proportions of the compounds may be adjusted 5 wt % either side of the proportions given and still are expected to be suitable, so long as the wt % total 100 wt %. For instance, if the compound proportions are about 50 wt %/about 50 wt %, then the proportions could permissibly range to about 45 wt %/about 55 wt %. Or in the case of the three-component embodiment of about 25 wt %/about 50 wt %/about 25 wt %, the proportions could permissibly be about 20 wt %/about 55 wt %/about 25 wt %, respectively; or alternatively about 25 wt %/about 55 wt %/about 20 wt %, respectively; or alternatively about 23 wt %/about 53 wt %/about 24 wt %, respectively, or the like.

The adsorbent bed useful in removing sulfur compounds from hydrocarbon streams that may be regenerated using the regeneration solvent of the kinds discussed herein may contain at least 5 grams of adsorbent material. The adsorbent material may be activated carbon, clay, a basic resin, silica gel, alumina, zeolites, and combinations thereof. Examples of a basic resin include, but are not necessarily limited to, polystyrene or polyacrylic polymers containing amino or ammonium substituents. In addition, these materials may be impregnated with metal ions including, but not necessarily limited to lead, copper or silver which increase their ability to remove sulfur compounds from the hydrocarbons. Further, if zeolites are used, the zeolites may be optionally impregnated with metals such as Fe, Zn, Sn and other metals.

The amount of regeneration solvent applied to or contacted with the adsorbent bed in order to properly regenerate the adsorbent material in a bed that has been used to remove sulfur compounds from a hydrocarbon stream is an amount that is effective in extracting the adsorbed sulfur compounds from the adsorbent material in the bed. The goal of the contacting the regeneration solvent with the adsorbent bed is to reduce the amount of adsorbed sulfur compounds to a level that makes the adsorbent bed suitable for reuse. Complete extraction of the adsorbed sulfur compounds from the adsorbent material is desirable, but it should be appreciated that complete removal is not necessary for the methods and compounds discussed herein to be considered effective. Success is obtained if more sulfur species are removed or extracted using the solvents described herein than in the absence of an effective amount of such solvents. In one embodiment, the amount of regeneration solvent effective for extracting the adsorbed sulfur compounds from a used (i.e. spent or depleted) adsorbent bed to allow for effectual reuse of the adsorbent bed to remove sulfur species from hydrocarbon streams is at least 10 milliliters of regeneration solvent per 5 grams of adsorbent material.

Alternatively, the weight ratio of solvent to absorbent may range from about 2:1 to about 1:2; in another non-limiting embodiment from about 2:1 to about 1:1, or in another non-restrictive embodiment from about 1:1 to about 1:2, or in a different non-limiting case about 1:1 solvent : adsorbent weight ratio.

In one non-limiting embodiment, the adsorbent bed can be regenerated at least 10 times before the adsorbent bed needs to be replaced; alternative, at least 2 times before the adsorbent bed needs to be replaced.

The regeneration of the adsorbent bed using the solvents described herein may be performed onsite, meaning that the regeneration solvent may be applied to the adsorbent bed without removing the vessel containing the adsorbent bed from the site at which it is in operation.

Once the adsorbent bed has been suitably regenerated using the solvents described herein, the resulting regenerated adsorbent bed may be used again to treat a hydrocarbon stream and help remove sulfur compounds from the hydrocarbon stream. The regenerated bed may be used alone or used in combination with a liquid-liquid extraction column to remove sulfur compounds from a hydrocarbon stream.

In one embodiment, prior to contacting the hydrocarbon stream containing sulfur compounds with a regenerated adsorbent bed, the hydrocarbon stream containing sulfur compounds may be contacted with an extraction solvent in a separate liquid-liquid extraction column. Extraction solvents suitable for use in the liquid-liquid extraction column for removal of sulfur compounds from a hydrocarbon stream may comprise a caustic and/or a quaternary ammonium hydroxide, such as the caustics and quaternary ammonium hydroxides described above. In an exemplary embodiment, the ratio of the volume of the extraction solvent to volume of the hydrocarbon stream ranges from about 100:1 to about 1:1.

The hydrocarbon stream from which sulfur compounds are removed using the adsorbent bed that is regenerated by the kinds of solvents described above and/or a liquid-liquid extraction may be any industrial hydrocarbon stream, in liquid and/or gas form, that contains sulfur compounds or sulfur species. Such streams include, but are not limited to, refinery feedstock, particularly light petroleum gases (LPG), such as (iso)butane and (iso)propane, straight run distillates, cracked stocks, hydrotreated materials, finished fuel blends, refinery fuel, flare gas, hydrogen, and possibly natural gas (which is composed mainly of methane and ethane), and/or oilfield condensate. As defined herein LPG is composed mainly of propane and butane. The hydrocarbon stream may contain from about 1 ppm independently to about 10,000 ppm of water, more typically from about 50 ppm independently to about 1,000 ppm of water.

The sulfur compounds present in the hydrocarbon stream desired to be removed or reduced may be, without limitation, thiophenes, benzothiophenes, alkyl sulfides, alkyl disulfides, carbonyl sulfide (COS), carbon disulfide ($CS_2$), hydrogen sulfide ($H_2S$), mercaptans, and combinations thereof.

The invention will be further described with respect to the following Examples, which are not meant to limit the invention, but rather to further illustrate the various embodiments.

EXAMPLES

In a test procedure, 20 milliliter samples of gasoline and kerosene containing about 801 ppm and 691 ppm of sulfur as sulfur compounds, respectively (where the sulfur compounds included hydrogen sulfide, C1-C6 mercaptans, thiophenes, dialkylsulfides, and dialkyldisulfides), were passed through (1) liquid-liquid extraction columns utilizing a caustic solution (40 wt % caustic+12 wt % $NaBH_4$ in water or 45 wt % KOH) or tetraethylammonium hydroxide ("TEAH") solution as the extraction solvent in a 1:1 ratio with the amount of gasoline, (2) fresh clay and/or activated carbon adsorbent beds, (3) clay and activated carbon adsorbent beds regenerated using a regeneration solvent made up of 25 wt % of a solution of 40 wt % caustic in water, 50 wt % of a mixture of 12% sodium borohydride and an alcohol, and 25 wt % quaternary ammonium hydroxide, and (4)

various combinations of these treatments to evaluate which treatments were effective in removing sulfur compounds from the gasoline samples.

Table 1 reflects the results of these evaluations.

TABLE 1

Comparison of Sulfur Reduction Using
Various Sulfur Removal Treatments

| No. | Sample | Gasoline Total Sulfur (ppm) | Kerosene Total Sulfur (ppm) |
|---|---|---|---|
| 1 | Blank | 801 | 691 |
| 2 | 40 wt % sodium hydroxide, 12 wt % NaBH$_4$ in water Treated | 639 | 507 |
| 3 | 45 wt % aqueous KOH Treated | 640 | 523 |
| 4 | Tetraethyl Ammonium hydroxide (TEAH) Treated | 610 | 461 |
| 5 | Direct Clay Treated | 601 | 542 |
| 6 | Direct Clay & Activated Carbon | 310 | 376 |
| 7 | 40 wt % sodium hydroxide, 12 wt % NaBH4 in water, clay & Activated carbon treated 1st run | 158 | 166 |
| 8 | 45 wt % aqueous KOH, clay & Activated carbon treated 2nd run | 176 | 182 |
| 9 | 40 wt % sodium hydroxide, 12 wt % NaBH4 in water, clay & Activated carbon treated 3rd run | 182 | 210 |
| 10 | 40 wt % sodium hydroxide, 12 wt % NaBH4 in water, clay & Activated carbon treated (After regeneration) | 162 | 172 |
| 11 | 45 wt % aqueous KOH, clay & Activated carbon treated 1st run | 170 | 172 |
| 12 | 45 wt % aqueous KOH, clay & Activated carbon treated 2nd run | 182 | 193 |
| 13 | 45 wt % aqueous KOH, clay & Activated carbon treated 3rd run | 199 | 211 |
| 14 | 45 wt % aqueous KOH, clay & Activated carbon treated (After regeneration) | 174 | 178 |
| 15 | TEAH, clay & Activated carbon treated 1st run | 146 | 119 |
| 16 | TEAH, clay & Activated carbon treated 2nd run | 147 | 117 |
| 17 | TEAH, clay & Activated carbon treated 3rd run | 158 | 127 |
| 18 | TEAH, clay & Activated carbon treated (After regeneration) | 145 | 115 |

The results of the evaluations of the performance of the various sulfur removal treatments show that sulfur removal treatment of each of the hydrocarbon samples above involving a combination liquid-liquid extraction using TEAH and use of clay and activated carbon beds regenerated using the regeneration solvent described in the previous paragraph provided the most sulfur reduction in both the gasoline and kerosene samples.

In the foregoing specification, the invention has been described with reference to specific embodiments thereof. However, the specification is to be regarded in an illustrative rather than a restrictive sense. For example, hydrocarbon streams, caustics, alcohols, quaternary ammonium hydroxide compounds, regeneration solvents, extraction solvents, sulfur compounds, adsorbent materials, contact/extraction processes, component proportions, and separation mechanisms falling within the claimed or disclosed parameters, but not specifically identified or tried in a particular example, are expected to be within the scope of this invention.

The present invention may be practiced in the absence of an element not disclosed. In addition, the present invention may suitably comprise, consist or consist essentially of the elements disclosed. For instance, the process for regenerating an adsorbent bed may comprise, consist of, or consist essentially of: contacting an adsorbent bed with an effective amount of regeneration solvent comprising, consisting essentially of, or consisting of compounds selected from the group consisting of (1) a caustic and an alcohol, (2) a caustic and a quaternary ammonium hydroxide, or (3) a caustic, an alcohol, and a quaternary ammonium hydroxide, to extract adsorbed sulfur compounds from the adsorbent bed, wherein the adsorbent bed contains at least 5 grams of adsorbent material. Alternatively, the process for removing sulfur compounds from a hydrocarbon stream using a regenerated adsorbent bed may comprise, consist of, or consist essentially of: contacting a hydrocarbon stream containing sulfur compounds with a regenerated adsorbent bed, wherein the regenerated adsorbent bed contains at least 5 grams of regenerated adsorbent material, and wherein, prior to contacting with the hydrocarbon stream, the adsorbent bed is contacted with at least 10 milliliters per 5 grams of adsorbent material of a regeneration solvent comprising, consisting essentially of, or consisting of a combination of compounds selected from the group consisting of (1) a caustic and an alcohol, (2) a caustic and a quaternary ammonium hydroxide, or (3) a caustic, an alcohol, and a quaternary ammonium hydroxide.

In addition, the regeneration solvent may comprise, consist of, or consist essentially of a combination of compounds selected from the group consisting of (1) a caustic and an alcohol, (2) a caustic and a quaternary ammonium hydroxide, or (3) a caustic, an alcohol, and a quaternary ammonium hydroxide.

The words "comprising" and "comprises" as used throughout the claims, are to be interpreted to mean "including but not limited to" and "includes but not limited to", respectively.

To the extent used herein, the word "substantially" shall mean "being largely but not wholly that which is specified."

As used herein, the singular forms "a," "an," and "the" are intended to include the plural forms as well, unless the context clearly indicates otherwise.

As used herein, the term "about" in reference to a given parameter is inclusive of the stated value and has the meaning dictated by the context (e.g., it includes the degree of error associated with measurement of the given parameter).

As used herein, the term "and/or" includes any and all combinations of one or more of the associated listed items.

What is claim is:

1. A process for regenerating an adsorbent bed, the process comprising:
    contacting the adsorbent bed with an effective amount of regeneration solvent comprising a combination of compounds selected from the group consisting of:
        (1) a caustic and an alcohol,
        (2) a caustic and a quaternary ammonium hydroxide, and
        (3) a caustic, an alcohol, and a quaternary ammonium hydroxide; and
    extracting adsorbed sulfur compounds from the adsorbent bed, wherein the adsorbent bed contains at least 5 grams of adsorbent material.

2. The process of claim 1, wherein the adsorbent material in the adsorbent bed is selected from a group consisting of activated carbon, clay, a basic resin, and combinations thereof.

3. The process of claim 1, wherein the caustic is a solution of from about 5 wt % caustic in water to a saturated aqueous caustic solution.

4. The process of claim 1, wherein the caustic is selected from a group consisting of potassium hydroxide, sodium hydroxide, lithium hydroxide, calcium hydroxide, magnesium hydroxide, sodium carbonate, sodium bicarbonate, potassium carbonate, potassium bicarbonate, calcium carbonate, calcium bicarbonate, magnesium carbonate, magnesium bicarbonate, lithium carbonate, lithium bicarbonate, and combinations thereof.

5. The process of claim 1, wherein the alcohol is selected from a group consisting of methanol, ethanol, propanol, glycol, polyglycols, and combinations thereof.

6. The process of claim 1, wherein the quaternary ammonium hydroxide is selected from a group consisting of tetraethylammonium hydroxide, tetramethylammonium hydroxide, tetrabutylammonium hydroxide, ethyltrimethylammonium hydroxide, benzyltrimethylammonium hydroxide, and the carbonates and bicarbonates of each quaternary hydroxides above, and combinations thereof.

7. The process of claim 1, wherein the regeneration solvent comprises about 50 wt % of a solution of 40 wt % caustic in water and about 50 wt % of a mixture of 12 wt % sodium borohydride and alcohol.

8. The process of claim 1, wherein the regeneration solvent comprises about 50 wt % of a solution of 40 wt % caustic in water and about 50 wt % of a mixture of 12 wt % sodium borohydride and quaternary ammonium hydroxide.

9. The process of claim 1, wherein the regeneration solvent comprises about 25 wt % of a solution of 40 wt % caustic in water, about 50 wt % of a mixture of 12 wt % sodium borohydride and an alcohol, and about 25 wt % quaternary ammonium hydroxide.

10. The process of claim 1, wherein the effective amount of regeneration solvent is at least 10 milliliters of the regeneration solvent per 5 grams of adsorbent material in the adsorbent bed.

11. The process of claim 1, wherein, prior to contacting with the regeneration solvent, the adsorbent bed is contacted with a hydrocarbon stream containing sulfur compounds to remove sulfur compounds from the hydrocarbon stream.

12. The process of claim 1, wherein the regeneration of the adsorbent bed is performed onsite.

13. A process for removing sulfur compounds from a hydrocarbon stream using a regenerated adsorbent bed, the process comprising:

contacting the hydrocarbon stream containing sulfur compounds with a regenerated adsorbent bed, wherein the regenerated adsorbent bed contains at least 5 grams of regenerated adsorbent material, at least partially adsorbing the sulfur compounds onto the regenerated adsorbent material and wherein, prior to contacting with the hydrocarbon stream, regenerating the adsorbent bed by contacting it with at least 10 milliliters per 5 grams of adsorbent material of a regeneration solvent comprising a combination of compounds selected from the group consisting of:
(1) a caustic and an alcohol,
(2) a caustic and a quaternary ammonium hydroxide, and
(3) a caustic, an alcohol, and a quaternary ammonium hydroxide.

14. The process of claim 13, wherein the hydrocarbon stream is selected from a group consisting of refinery feedstock, light petroleum gases (LPG), (iso)butane, (iso) propane, straight run distillates, cracked stocks, hydrotreated materials, finished fuel blends, refinery fuel, flare gas, hydrogen, natural gas, and/or oilfield condensate, and combinations thereof.

15. The process of claim 13, wherein sulfur compounds are selected from a group consisting of thiophenes, benzothiophenes, alkyl sulfides, alkyl disulfides, carbonyl sulfide (COS), carbon disulfide ($CS_2$), hydrogen sulfide ($H_2S$), mercaptans, and combinations thereof.

16. The process of claim 13, wherein, prior to contacting the hydrocarbon stream containing sulfur compounds with a regenerated adsorbent bed, the hydrocarbon stream containing sulfur compounds is contacted with an extraction solvent in a separate vessel.

17. The process of claim 16, wherein the extraction solvent comprises a caustic or a quaternary ammonium hydroxide.

18. The process of claim 16, wherein the ratio of extraction solvent to hydrocarbon stream ranges from about 100:1 to about 1:1.

19. The process of claim 17, wherein the caustic is a solution of from about 5 wt % potassium hydroxide to a saturated potassium hydroxide solution.

20. The process of claim 17, wherein the quaternary ammonium hydroxide is tetraethylammonium hydroxide.

* * * * *